United States Patent [19]

Farr

[11] 4,273,516
[45] Jun. 16, 1981

[54] PUMPS FOR FLUIDS

[75] Inventor: Glyn P. R. Farr, Leek Wootton, England

[73] Assignee: Girling Limited, Birmingham, England

[21] Appl. No.: 25,864

[22] Filed: Apr. 2, 1979

[30] Foreign Application Priority Data

Apr. 11, 1978 [GB] United Kingdom ............... 14078/78

[51] Int. Cl.³ .............................................. F04B 49/08
[52] U.S. Cl. .................................... 417/214; 417/279; 417/402; 417/441
[58] Field of Search ............... 417/214, 279, 540, 402, 417/441

[56] References Cited

U.S. PATENT DOCUMENTS

| 862,867 | 8/1907 | Eggleston | 138/31 X |
|---|---|---|---|
| 2,228,292 | 1/1941 | Wood | 417/279 |
| 2,432,798 | 12/1947 | Pratt et al. | 417/214 |
| 2,650,543 | 9/1953 | Pauget | 417/214 |
| 3,006,148 | 10/1961 | Hause | 417/214 X |
| 3,362,346 | 1/1968 | Bottoms et al. | 417/540 |
| 3,836,285 | 9/1974 | Purtell | 417/279 X |
| 4,149,831 | 4/1979 | Davis | 417/251 |

Primary Examiner—Carlton R. Croyle
Assistant Examiner—Edward Look
Attorney, Agent, or Firm—Scrivener, Clarke, Scrivener and Johnson

[57] ABSTRACT

A pump assembly for an hydraulic braking system comprises a housing having an inlet for connection to a tank for liquid, an outlet for connection to an hydraulic accumulator, and a piston reciprocably mounted in a bore in the housing to draw liquid into a working chamber during an induction stroke and to force it to the outlet during a power stroke. A drive mechanism is provided for moving the piston in one direction during the induction stroke, and the piston is moved in the opposite direction during the power stroke by subjecting the piston to pressure at the outlet.

4 Claims, 3 Drawing Figures

PUMPS FOR FLUIDS

SPECIFIC DESCRIPTION

This invention relates to pumps for fluids.

In hydraulic systems in which a pump is utilised to draw fluid from a tank to charge an accumulator, an unloader is normally required to divert the delivery flow from the pump back to the tank when the accumulator is fully charged. Since the fluid is continuously circulated, an unnecessary amount of work is done on the fluid. Ideally, therefore, once the accumulator has been charged, circulation of fluid should cease with the pump being rendered inoperative.

It is known that conventional self-stalling petrol or vacuum pumps use a spring to provide a pumping stroke acting against an eccentric cam drive. When a desired pressure is attained the spring is unable to overcome the output pressure, with the result that the pump stalls. Due to practical considerations such an arrangement cannot be adapted to an hydraulic pump which is capable of developing high pressures, in the order of 13.8 $MN/m^2$, which are required for hydraulic power operated vehicle braking systems. This is because the necessary spring pre-load would have to be excessive. For example, a pre-load of 1000 N would be required for an output piston of 9.5 m.m diameter.

According to our invention a pump assembly for an hydraulic braking system comprises a housing having an inlet for connection to a tank for liquid, an outlet for connection to an hydraulic accumulator, a piston reciprocally mounted in a bore in the housing to draw liquid from the inlet and into a working chamber during an induction stroke defined by movement of the piston in a first direction, and to force liquid from the working chamber to the outlet during a power stroke defined by movement of the piston in the second opposite direction, drive means for urging the piston in the first direction, and means for subjecting the piston to pressure at the outlet to move the piston in the second direction.

The piston is also biassed in the second direction by means of a relatively light spring. This is operative to move the piston in the second direction only when zero or a very low pressure exists at the outlet and the effect of the spring in biassing the piston in the second direction decreases progressively with increase in pressure at the outlet. The piston is not subjected to any other spring loading.

Utilising the pressure at the outlet, namely accumulator pressure, to bias the piston in the second direction to produce the power stroke enables high pressures to be developed by the pump.

Conveniently the piston is of stepped outline with the pressure at the outlet acting over an area which is greater than the area which acts on the working liquid on the induction and power strokes, and the drive means comprises an eccentric drive which acts on the end of the piston which is of smaller area. Thus, the smaller area of the piston generates in the working chamber a higher pressure than the corresponding pressure at that time existing in the accumulator, which acts over the greater area.

Preferably a pressure-responsive valve is located between the working chamber and the outlet to prevent overcharging and to limit the pressure which can be applied to the outlet. Upon closure of the pressure-responsive valve to isolate the working chamber from the outlet at a pressure known as the "cut-out" pressure the piston is subjected to a pressure balance which holds it at the maximum extent of its induction stroke in a stationary position at which it is self-stalled with the drive means rendered ineffective.

The pressure-responsive valve is preferably constructed and arranged to open only when the pressure at the outlet has reduced to a predetermined pressure known as the "cut-in" pressure. This gives the accumulator a predetermined working range during which the pump is inoperative. When the pressure-responsive valve comprises a valve member which is urged away from a seating by the load in a spring which acts on the valve member through a limiting piston responsive to pressure at the outlet, the cut-out pressure is determined by the force of the spring divided by the area of the limiting piston, and the cut-in pressure is determined by the same parameters but taking into account the respective areas of the differential piston and the area of the seating.

One embodiment of our invention is illustrated in the accompanying drawings in which.

Figure 1:
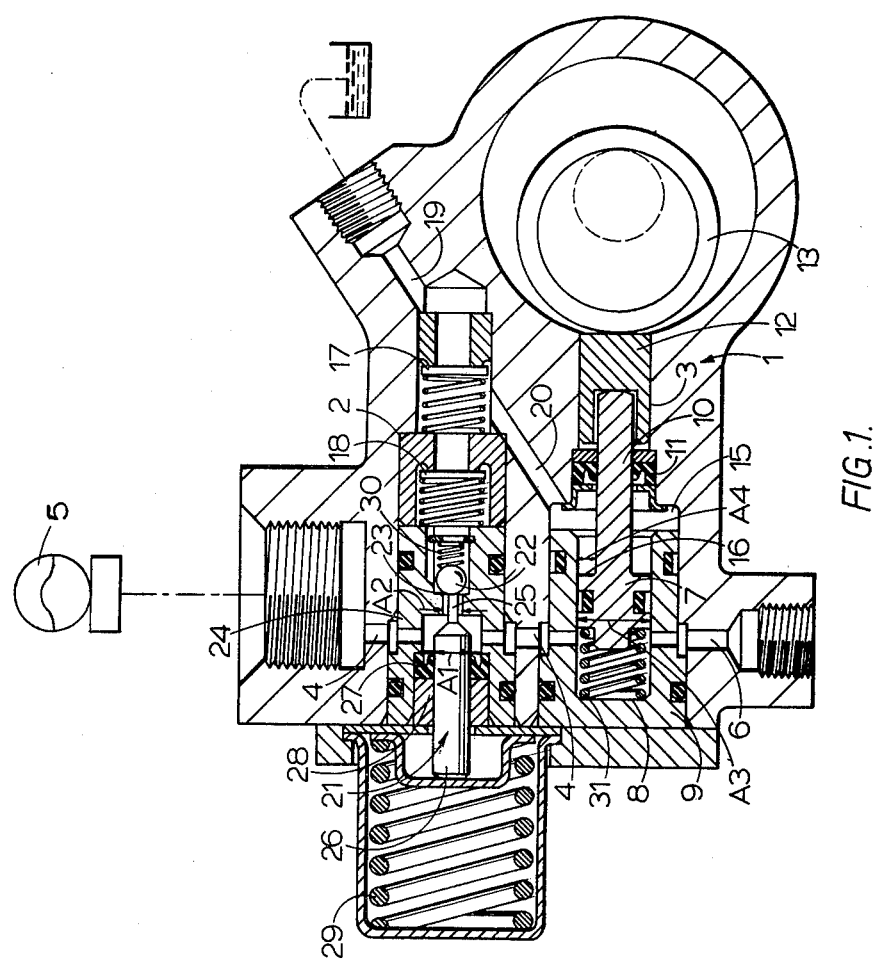
FIG. 1 is a longitudinal section through an hydraulic pump assembly.
Figure 2:
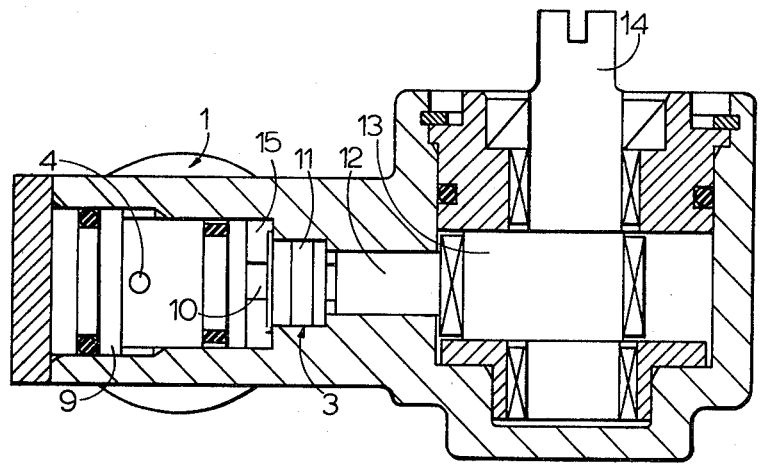
FIG. 2 is a section on the axis of the pump piston of FIG. 1.
Figure 3:
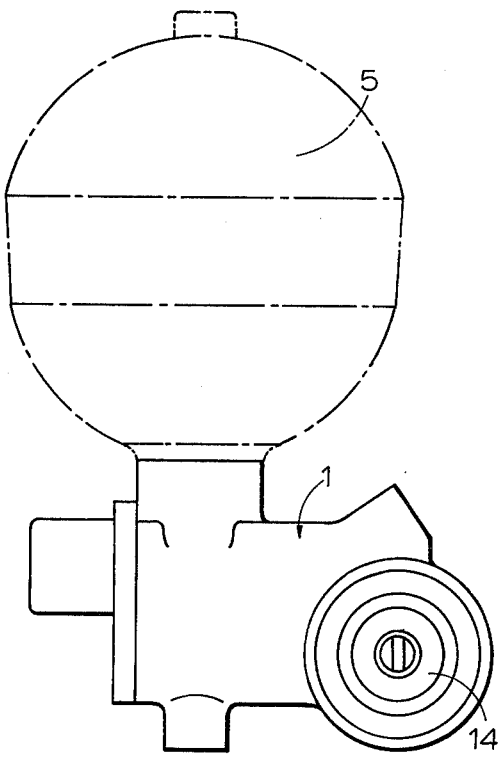
FIG. 3 is an end elevation of the pump assembly.

The pump assembly illustrated in the drawings comprises a housing 1 provided with two longitudinally-extending parallel bores 2 and 3 which are interconnected by a transverse passage 4. An outlet passage leads from the bore 2 into an hydraulic accumulator 5, shown in chain-dotted outline in FIG. 3, and an outlet passage 6 leads from the bore 3 to vehicle brake actuating means.

Both bores 2 and 3 are of stepped outline having four bore portions of progressively increased diameter.

A pump piston 7 works in a blind bore 8 of a sleeve 9 of cup-shaped outline which is accommodated within the two bore portions of the bore 3 which are of greatest diameter with the closed end of the sleeve 9 acting as a closure for that end of the bore 3. The piston 7 is carried by an integral rod 10 which works through a seal 11 housed in that portion of the bore 3 which is adjacent to the portion of smallest diameter. The rod 10 engages at its free end with a follower 12. The follower 12, in turn, is guided to slide in that bore portion and is reciprocated by an eccentric drive in the form of a cam 13 which is integral with a shaft 14 rotatable about an axis normal to the axis of the bore 3.

A working chamber 15 is defined in the bore 3 between the seal 11 and the annular shoulder 16 at the change in diameter between the piston 7 and the rod 10.

A pair of normally closed spring-loaded one-way valves 17 and 18 are located in series in the bore 2 to control communication between an inlet 19, for connection to a tank for hydraulic fluid at atmospheric pressure, and the accumulator 5 through the working chamber 15. Specifically, during an induction stroke in which the piston 7 is moved by the drive cam 13 towards the closed end of the sleeve 9, fluid is drawn into the working chamber 15 past the one-way valve 17 and through an inclined passage 20 with the one-way valve 18 closed. During a power stroke with the piston 7 moving in the opposite direction, the one-way valve 17 is closed and the fluid in the power chamber 15 is forced into the accumulator 5 past the valve 18 which opens.

A pressure-responsive valve 21 is housed between the one-way valve 18 and the accumulator 5. As illustrated the pressure-responsive valve 21 comprises a valve member 22 in the form of a ball which is normally urged away from a seating 23 in a seating member 24 by means of a reduced diameter portion 25 at the free inner end of a limiting piston 26. The seating member 24 is housed in the portions of the bore 2 which are of greatest diameter. The piston 26 works through a seal 27 at the inner end of a plug 28 for the open outer end of the seating member 24 and is urged inwardly by a caged spring 29 to hold the ball 22 away from the seating 23 against the force in a light compression spring 30.

Normally the pressure-responsive valve 21 is open so that reciprocation of the piston 7 causes fluid to be pumped into the accumulator 5 as described above and, due to the provision of the passage 4, the pressure in the accumulator 5 acts on the face of the piston 7 which is opposite the rod 10 to bias it towards the cam 13. Thus this pressure acting over an area $A_3$, which is greater than the area $A_4$ of the shoulder 16, exerts a resultant force on the piston 7 to urge it in that direction as permitted by the profile of the cam 13 and defining the power stroke. Thus, due to the difference in the areas $A_3$ and $A_4$, a lower pressure in the accumulator 5 acting over the area $A_3$ produces a greater pressure in the working chamber 15 by the effect of the smaller area, the said greater pressure in turn being supplied to the accumulator 5.

Increase in pressure in the accumulator 5 continues until that pressure acting over the area $A_1$ of the limiting piston 26 attains a predetermined value at a "cut-out" point which is sufficient to overcome the load S in the spring 29 whereupon the limiting valve 21 closes. This means that after the pump piston 7 has reached top dead centre at the next revolution of the cam 13, the piston 7 will remain substantially in that position thereby allowing the cam 13 and the shaft 14 to run freely without any fluid circulating. Furthermore, as soon as the pressure-responsive valve 21 closes, the pressure acting on the valve member 22 on the side remote from the piston 26 rises to a value determined by the difference between the areas $A_3$ and $A_4$. This pressure acts on the area $A_2$ of the valve seat 23 to augment the force opposing the load in the spring 29. This has the effect of preventing the pressure-responsive valve 21 from opening as the pressure in the accumulator 5 is reduced, at least until a cut-in point is reached at a pressure lower than the pressure at which the limiting valve closed.

The pressure PO at the cut-out point is determined by the formula:

$$PO = S/A_1$$

and the pressure Pi at the cut-in point is determined by the formula:

$$Pi = \frac{S}{A_1 + \left(\frac{A_3}{A_4} - 1\right) A_2}$$

$A_2$ = area of ball valve seat
so if $S = 180$ N, $A_1 = 20 \times 10^{-6} \text{m}^2$, $A_2 = 13 \times 10^{-6} \text{m}^2$,
$A_3 = 80 \times 10^{-6} \text{m}^2$ and $A_4 = 50 \times 10^{-6} \text{m}^2$ Then $$PO = \frac{180}{20 \times 10^{-6}} = 9\text{MN/m}^2 \cong 90 \text{ bar}$$

$$PI = \frac{180}{20 \times 10^{-6} + \left(\frac{80 \times 10^{-6}}{50 \times 10^{-6}} - 1\right) 13 \times 10^{-6}}$$

$$= \frac{180}{20 \times 10^{-6} + 7.8 \times 10^{-6}} = 6.47\text{MN/m}^2 \cong 65 \text{ bar}$$

This gives the accumulator 5 a reasonable working range.

It will be noted that a spring 31 is provided to urge the piston 7 towards the cam 13. This is provided to provide the power stroke when the accumulator 5 is fully exhausted, and its effect decreases with increase in the pressure or the accumulator. Since the area $A_3$ is greater than the area $A_4$ less fluid is forced into the accumulator than is being taken out. However, on the next induction stroke, some fluid is drawn into the chamber 15 and this is passed to the accumulator 5 on the next power stroke. Therefore, on the next induction stroke, the piston 7 moves against the pressure in the accumulator 5 so that that pressure assists for at least a part of the power stroke.

Our invention provides a pump assembly which will operate with conventional brake fluid, or with the more common mineral fluid. In addition, our invention provides a minimum drive torque when idling, since the piston 7 is stalled at T.D.C.

I claim:

1. An hydraulic pump system comprising an hydraulic accumulator for supplying services, a tank for liquid, a pump assembly for pumping liquid from said tank to said hydraulic accumulator to charge said accumulator, and a pressure-responsive valve responsive to pressure in said accumulator for preventing pressure in said accumulator from exceeding a predetermined cut-out valve, wherein said pump assembly comprises a housing having an inlet for connection to said tank for liquid, an outlet for connection to said hydraulic accumulator, an intake check valve in said inlet and a discharge check valve in said outlet, and a bore, means defining a working chamber, a pump piston reciprocably mounted in said bore to draw liquid from said inlet and into said working chamber during an induction stroke defined by movement of said pump piston in a first direction, and to force liquid from said working chamber to said outlet during a power stroke defined by movement of said pump piston in a second opposite direction, drive means for urging the pump piston in said first direction, and means for subjecting said pump piston to the effect of pressure at said outlet to move said pump piston in said second direction, said pump piston being of stepped outline having a first area over which pressure at said outlet acts, and a second area smaller than said first area for acting on said liquid in said working chamber during said induction and power strokes, and said pressure-responsive valve is disposed between said discharge check valve and said outlet, said pressure-responsive valve being movable between an open position, and a closed position when pressure in said accumulator attains said cut-out value, in said open position liquid can be forced from said working chamber to said hydraulic accumulator during said power stroke, and in said closed position said working chamber is isolated from said outlet and a volume of liquid drawn into said working chamber during an induction stroke is trapped in said working chamber by said pressure-responsive valve to prevent said pump piston from moving in said second opposite direction whereby said pump is disabled and no further circulation of liquid can take place until pressure in said accumulator has reduced to a predetermined cut-in pressure which is less than said cut-out value of pressure in said accumulator.

2. A system as claimed in claim 1, wherein a spring is also provided for biassing said piston in said second direction.

3. A system as claimed in claim 1, wherein said drive means comprises an eccentric drive acting on an end of said piston which is of a smaller area.

4. A system as claimed in claim 1, wherein said pressure-responsive valve comprises a valve member, a seating engageable by said valve member, a spring for urging said valve member away from said seating, and a limiting piston through which said spring acts on said valve member, said limiting piston being responsive to pressure at said outlet and movable against the load in said spring to permit said valve member to engage said seating.

* * * * *